US009369982B2

(12) United States Patent
Yang et al.

(10) Patent No.: US 9,369,982 B2
(45) Date of Patent: Jun. 14, 2016

(54) ONLINE ADAPTIVE FUSION FRAMEWORK FOR MOBILE DEVICE INDOOR LOCALIZATION

(71) Applicants: Shao-Wen Yang, Hillsboro, OR (US); Lei Yang, Hillsboro, OR (US); Xue Sharon Yang, Arcadia, CA (US)

(72) Inventors: Shao-Wen Yang, Hillsboro, OR (US); Lei Yang, Hillsboro, OR (US); Xue Sharon Yang, Arcadia, CA (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 14/229,136

(22) Filed: Mar. 28, 2014

(65) Prior Publication Data

US 2015/0282111 A1    Oct. 1, 2015

(51) Int. Cl.
*H04M 1/00*    (2006.01)
*H04W 64/00*   (2009.01)
*H04W 4/04*    (2009.01)

(52) U.S. Cl.
CPC .............. *H04W 64/00* (2013.01); *H04W 4/04* (2013.01)

(58) Field of Classification Search
CPC ................................................. H04W 64/00
USPC ........................................... 455/456.1–456.6
See application file for complete search history.

(56) References Cited

U.S. PATENT DOCUMENTS

| | | | | |
|---|---|---|---|---|
| 2001/0022558 A1* | 9/2001 | Karr, Jr. | ................ | G01S 1/026 342/450 |
| 2005/0040968 A1* | 2/2005 | Damarla | ............... | H04W 64/00 340/5.53 |
| 2012/0056785 A1* | 3/2012 | Jovicic | ................. | G01S 5/0236 342/450 |
| 2013/0012235 A1* | 1/2013 | Burdo | ................. | G01C 21/20 455/456.3 |
| 2013/0045759 A1* | 2/2013 | Smith | .................. | H04W 64/00 455/456.6 |
| 2013/0053059 A1* | 2/2013 | Kruglick | ............. | G01A 5/0252 455/456.1 |
| 2013/0162481 A1* | 6/2013 | Parvizi | ................. | G01S 3/023 342/452 |
| 2013/0225197 A1* | 8/2013 | McGregor | ............ | G01S 1/042 455/456.1 |
| 2014/0148196 A1* | 5/2014 | Bassan-Eskenazi | .... | G01S 11/02 455/456.1 |
| 2014/0171068 A1* | 6/2014 | Marti | ..................... | G01S 1/047 455/427 |
| 2014/0247279 A1* | 9/2014 | Nicholas | .............. | G06T 19/006 345/633 |
| 2014/0247280 A1* | 9/2014 | Nicholas | .............. | G06T 19/006 345/633 |
| 2015/0099539 A1* | 4/2015 | Titus | ..................... | H04W 64/00 455/456.1 |

\* cited by examiner

*Primary Examiner* — Charles Shedrick
(74) *Attorney, Agent, or Firm* — Sutherland Asbill & Brennan LLP

(57) ABSTRACT

This disclosure describes systems, methods, and computer-readable media related to employing particle filter methods to estimate the location of a mobile device. The data may include wireless data measurement associated with the mobile device and one or more access points and inertial data associated with the mobile device. Radio fingerprinting data associated with the one or more access points may be retrieved. A respective location for the wireless data measurements may be determined based on the radio fingerprinting data and inertial data. A respective weight may be calculated for the respective location for each of the plurality of particles. A respective confidence level may be maintained for the respective location for each of the plurality of particles. A current location may be identified based on the respective location for each of the plurality of particles and the respective weight associated with the respective location for each of the particles.

21 Claims, 4 Drawing Sheets

ONLINE ADAPTIVE FUSION FRAMEWORK FOR MOBILE DEVICE INDOOR LOCALIZATION

BACKGROUND

Mobile devices are often continuously connected to one or more networks, such as a wireless network. However, identifying a location of the mobile devices within a confined area, such as the inside of a building, may not be possible using systems, such as global positioning systems as they are not able to detect a location due to line of sight restrictions within the confined area. Existing indoor positioning systems may rely on beacon, such as access points, which may provide environmental context for devices to sense. However, no standardization exist for such systems and often are not accurate or reliable when used to determine an accurate location of a mobile device.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
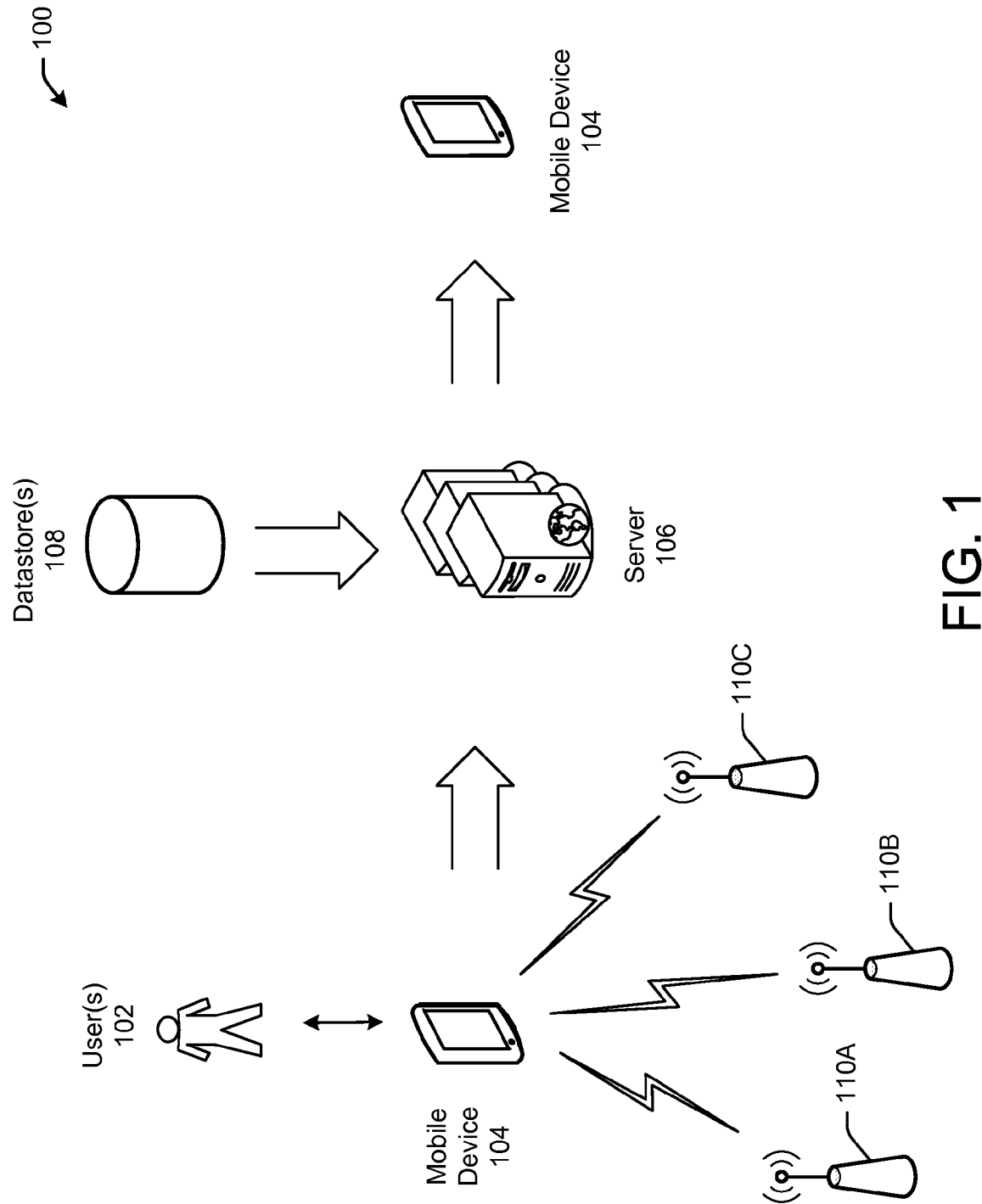
FIG. 1 depicts an illustrative data flow between various components of an illustrative system architecture for online adaptive fusion framework for mobile device indoor localization in accordance with one or more embodiments of the disclosure.

This disclosure relates to, among other things, systems, methods, computer-readable media, techniques, and methodology for online adaptive fusion framework for mobile device indoor localization. Indoor location technology may be utilized to deliver location-based services. In the absence of accurate global positioning system (GPS) coverage in indoor environments, existing wireless technologies may be utilized for indoor positioning (e.g., WiFi, ultra wideband (UWB), ZigBee, etc.). This disclosure is directed to employing particle filters (also known as Sequential Monte Carlo (SMC)) methods to estimate the location (i.e., planar coordinates and heading orientation). Although the disclosure describes embodiments in the context of WiFi networks, the proposed technology may be utilized by other wireless technologies, including but not limited to Bluetooth, UWB, ZigBee, or the like.

Particle filtering or SMC methods may be on-line posterior density estimation algorithms to estimate the posterior density of a state-space by directly implementing Bayesian recursion equations. Particle filtering may utilize a discretization approach, using a set of particles to represent the posterior density. Particle filtering may provide a methodology for generating samples from the required distribution without requiring assumptions about the state-space model or the state distributions. The state-space model may be non-linear and the initial state and noise distributions may take any form required. Particle filtering may implement the Bayesian recursion equations directly by using an ensemble based approach. The samples from the distribution may be represented by a set of particles. Each particle may be associated with a weight that represents the probability of that particle being sampled from the probability density function.

Weight disparity leading to weight collapse may be mitigated by including a resampling step before the weights become too uneven. In the resampling step, the particles with negligible weights may be replaced by new particles in the proximity of the particles with higher weights.

Radio based fingerprinting may enable robust indoor positioning by providing global location estimations with bounded errors. Additionally, it does not require prior location estimates to initialize the estimation. In some embodiments, inertial sensor based location tracking may also achieve accurate location tracking within a short period of time, but the location errors may grow unbounded with time. Particle filtering may offer a computationally efficient way to combine radio based fingerprint and inertial tracking to leverage their complementary error characteristics in location estimations.

One of the key challenges in the implementation of particle filtering is to determine when to trust location fix from radio fingerprint and when to trust the location estimation from inertial tracking The location accuracy from radio fingerprint may depend on environment factors such as the density of the access points, the relative placement of the access points, and the temporal/spatial variations of WiFi signals. The quality of inertial location tracking may depend on the sensor quality as well as the user position in holding the mobile device. For example, if user holds the user device stably without significant out-of-plane motions, the inertial location tracking may be done much more reliably than the case when the user swings the mobile device back and forth.

Existing technologies may select a fixed set of parameters optimized for a subset of usages, and relying on manual tuning, which may not ensure consistent performance across all usage scenarios. This disclosure describes how to dynamically adjust the confidence levels of radio fingerprinting against the location estimation from the inertial sensor tracking Under the theoretical framework of non-parametric Bayesian estimation, a self-optimized online adaptive scheme based on SMC sampling is introduced, where the relative confidence between fingerprint database and floor plan map is estimated based on the consistency between the radio measurements and the fingerprint database. In some embodiments, particle filtering may be used to track the locations of particles and track the relative confidence between the radio fingerprint location and the inertial location tracking When floor map is available, floor map constraints may be leveraged to speed up the convergence of relative confidence estimation.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

FIG. 1 depicts an illustrative data flow between various components of an illustrative system architecture for online adaptive fusion framework for mobile device indoor localization in accordance with one or more embodiments of the disclosure. One or more illustrative mobile device(s) 104 operable by one or more user(s) 102 are illustratively depicted in FIG. 1. The mobile device(s) 104 may include any suitable processor-driven computing device including, but not limited to, a desktop computing device, a laptop computing device, a server, a smartphone, a tablet, and so forth. For ease of explanation, the mobile device(s) 104 may be described herein in the singular; however, it should be appreciated that multiple mobile device(s) 104 may be provided.

The mobile device 104 may communicate with one or more access points 110A, 110B, 110C (collectively 110). Each access points 110 may be configured with a unique identifier and, optionally, additional information about the access points 110. The access points 110 may provide wireless signal coverage for an area. The mobile device 104 may capture measurements associated with the communication between the mobile device 104 and the access points 110. The measurements may include received signal strength indicators (RSSIs), each of which is a measurement of the power present in a received radio signal.

Sensors (e.g., accelerometer, gyroscope, or the like) associated with the mobile device 104 may capture inertial data of the mobile device 104. In some embodiments, the mobile device 104 may include an inertial navigation system or the like to capture inertial data associated with the mobile device 104. An inertial navigation system is a navigation aid that utilizes motion sensors (e.g., accelerometers) and rotation sensors (e.g., gyroscopes) to continuously calculate via dead reckoning the position, orientation, and velocity (e.g., direction and speed of movement) of a mobile device 104 without the need for external references.

The measurements and inertial data may be transmitted to a server 106. The server may also receive data from one or more datastores 108, such as floor map information for a specific location and/or access point radio fingerprint data associated with the one or more access points 110.

Radio fingerprinting data may include information that identifies the one or more access points 110 or any other radio transmitter by the unique "fingerprint" that characterizes its signal transmission. An electronic fingerprint makes it possible to identify a wireless device by its unique radio transmission characteristics.

The server 106 may determine a current location of the mobile device 104 based at least in part on the inertial data, measurement data, access point fingerprint data, and/or floor map information. The location may be used to provide location-based services to the identified mobile device 104.

Figure 2:
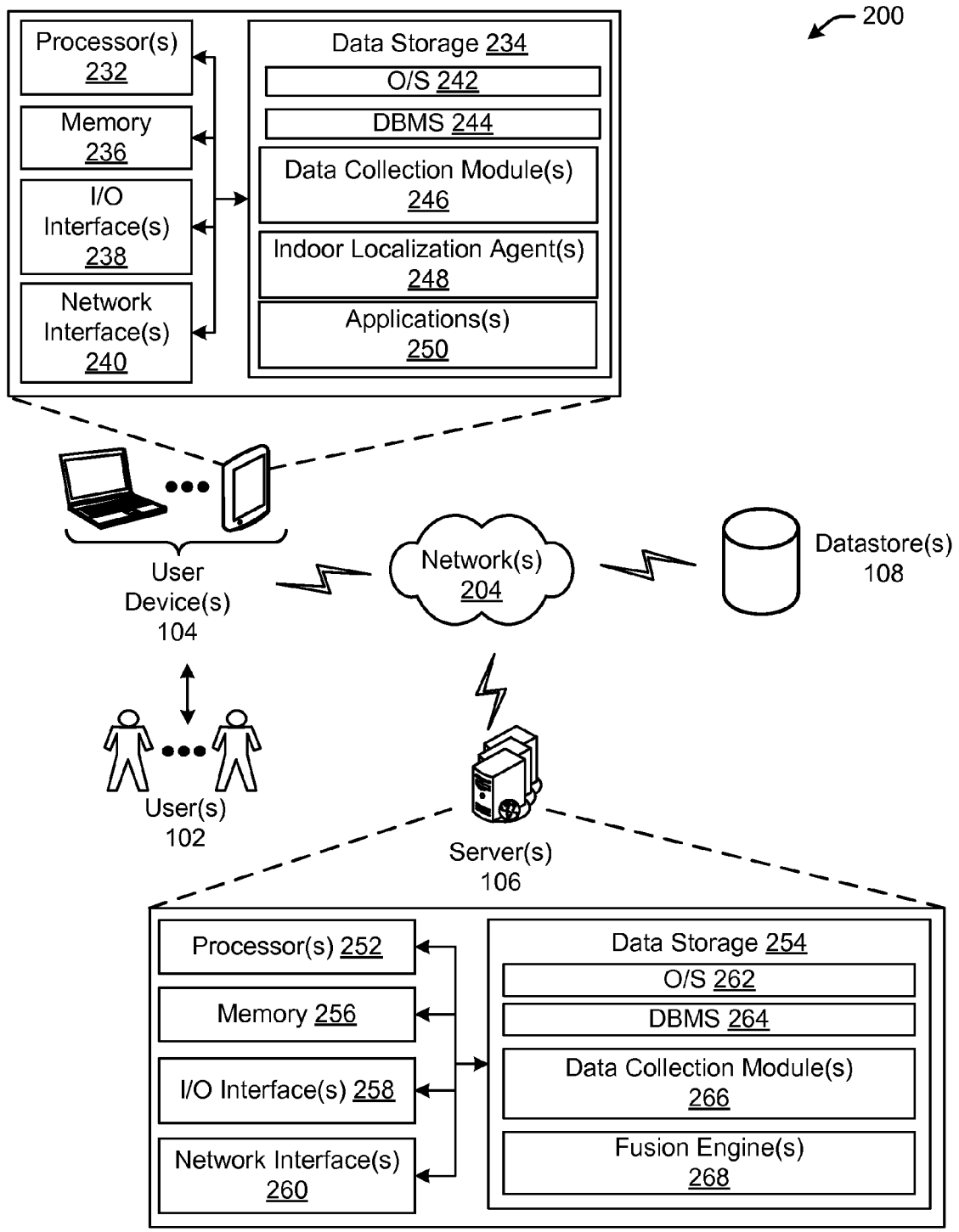
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative system architecture 200 may include one or more mobile devices 104 operable by one or more user(s) 102, one or more datastore(s) 108, one or more access points, and/or one or more server(s) 106. mobile user device(s) 104 may include any of the types of devices described through reference to FIG. 1. The datastore(s) 108 may include any of the types of devices described through reference to FIG. 1. The server(s) 106 may include any of the types of devices described through reference to FIG. 1.

Any of the mobile device(s) 104, datastore(s) 108, access point(s) 110, and/or server(s) 106 may be configured to communicate with each other and any other component of the system architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 204 may have any suitable communication range associated therewith and may include, for example, global networks (e.g., the Internet), metropolitan area networks (MANs), wide area networks (WANs), local area networks (LANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Any of the mobile device(s) 104, datastore(s) 108, access point(s) 110, and/or server(s) 106 may include one or more communications antennae. Communications antenna may be any suitable type of antenna corresponding to the communications protocols used by the mobile device(s) 104, datastore(s) 108, access point(s) 110, and/or server(s) 106. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 108.

Any of the mobile device(s) 104, datastore(s) 108, access point(s) 110, and/or server(s) 106 may include transmit/receive (transceiver) or radio components may include any suitable radio and/or transceiver for transmitting and/or receiving radio frequency (RF) signals in the bandwidth and/or channels corresponding to the communications protocols utilized by any of the mobile device(s) 104, datastore(s) 108, access point(s) 110, and/or server(s) 106 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The mobile device(s) 104 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the user device(s) 104, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The mobile device(s) 104 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The mobile device(s) 104 may further include network interface(s) 240 that facilitate communication between the mobile device(s) 104 and other devices of the illustrative system architecture 200 (e.g., datastore(s) 108, server(s) 106, etc.) or application software via the network(s) 204. The mobile device(s) 104 may additionally include one or more input/output (I/O) interfaces 238 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the mobile device 104 and the hardware resources of the mobile device 104. More specifically, the O/S 242 may include a set of computer-executable instructions for managing the hardware resources of the mobile device(s) 104 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., datastore 110). The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more data collection module(s) 246, one or more indoor localization agent(s) 248, and/or one or more application(s) 250.

The data collection module(s) 246 may include computer-executable instructions that in response to execution by the processor(s) 232 cause operations to be performed including receiving input from one or more sensors, such as a gyroscope or accelerometer or generating and/or obtaining wireless data, such as wireless signal strengths. The data collection module(s) 246 may be responsible for receiving or otherwise obtaining information associated with a mobile device 104.

The indoor localization agent(s) 248 may include computer-executable instructions that in response to execution by the processor(s) 232 cause operations to be performed including receiving or otherwise obtaining data collected by the data collection module(s) 246. The indoor localization agent (s) 248 may generate and transmit messages to one or more server(s) 106 for processing and may receive data from the one or more server(s) 106 that may be used for location-based services, such as receiving coupons or other services based on the current location of the user device 102. In some embodiments, the indoor localization agent may receive data from other user device(s) 104 and/or one or more server(s) 106 and may determine a location of its own position and/or the position of other user device(s) 104 based on the information received. For example, the calculating and determination described as being performed by the fusion engine(s) 268 of the server(s) 106 may, in some embodiments, be partially or fully performed by an indoor localization agent(s) 248 of a user device 104.

The application(s) 250 may include computer-executable instructions that in response to execution by the processor(s) 232 cause operations to be performed including executing of different functionality specific to the application(s) 250. In some embodiments, the application(s) 250, in response to receiving the notification, may initiate data synchronization with one or more remote servers, access the Internet, display email, or the like.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The server(s) 106 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the server(s) 108, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The server(s) 106 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The server(s) 106 may further include network interface(s) 260 that facilitate communication between the server(s) 106 and other devices of the illustrative system architecture 200 (e.g., mobile device(s) 104, datastore(s) 108, etc.) or application software via the network(s) 204. The server(s) 106 may additionally include one or more input/output (I/O) interfaces 258 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the server(s) 106 and the hardware resources of the server(s) 106. More specifically, the O/S 262 may include a set of computer-executable instructions for managing the hardware resources of the server(s) 106 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores (e.g., datastore 108). The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more data collection module(s) 266 and/or one or more fusion engine(s) 268.

The data collection module(s) 266 may include computer-executable instructions that in response to execution by the processor(s) 252 cause operations to be performed including obtaining information, such as information associated with a mobile device 104 or inertial data associated with a mobile device 104 from the mobile device 104, retrieving data from one or more datastore(s) 108, such a radio fingerprint data associated with one or more access points of a wireless network and/or floor plan data associated with a location. The data collection module 266 may also be responsible for the management of the data, such as updating data in the datastore(s) 108 and the like.

The fusion engine(s) 268 may include computer-executable instructions that in response to execution by the processor(s) 252 cause operations to be performed including obtaining data from the data collection module 266, analyzing the data, identifying a location of the mobile device 104 based at least in part on the analyzed data, generating one or more confidence levels, and the like. In some embodiments, the fusion engine(s) 268 may continuously recalculate and/or identify a current location of the mobile device 104 based on data received from the mobile device 104.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
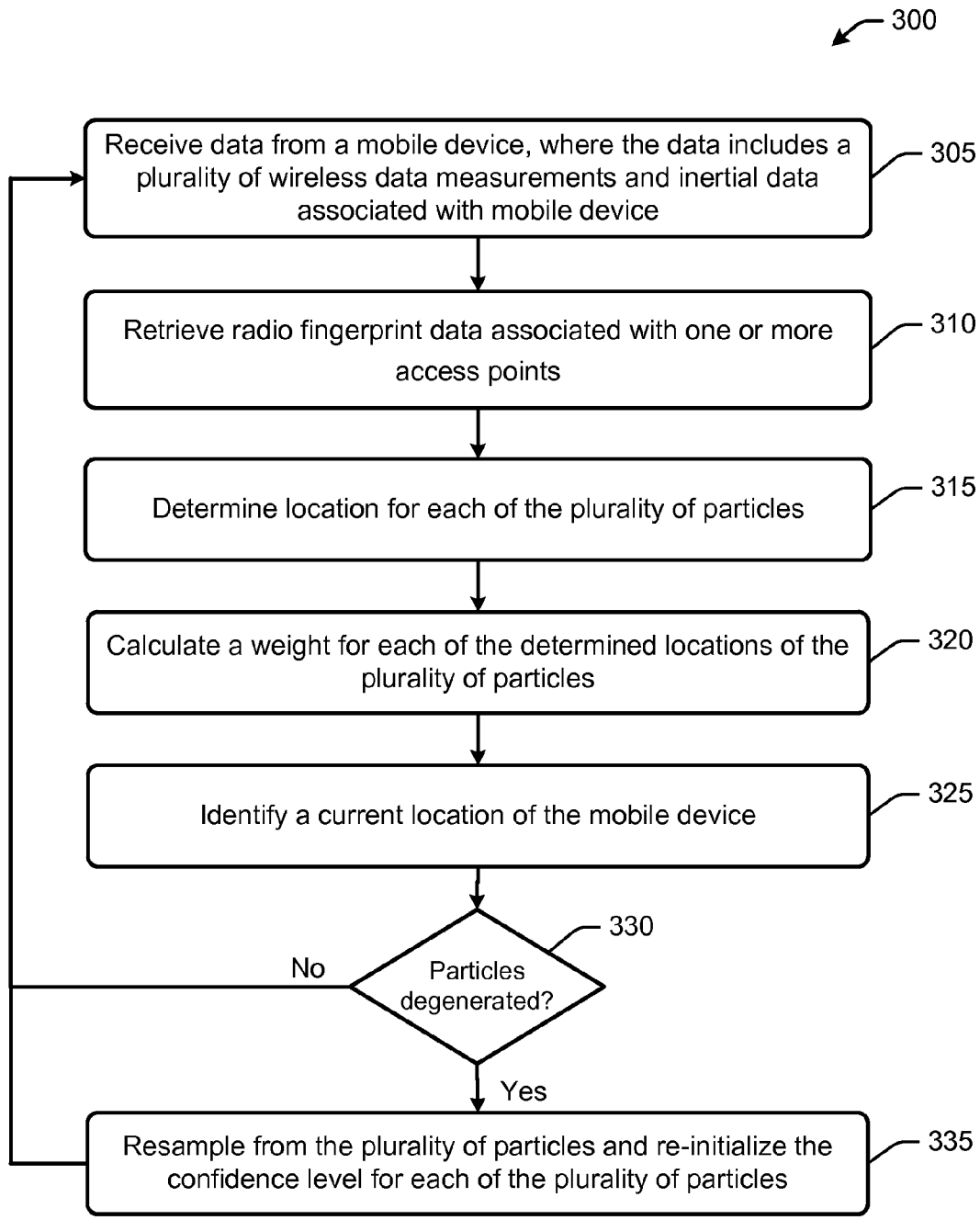
FIG. 3 is a process flow diagram of an illustrative method for online adaptive fusion framework for mobile device indoor localization in accordance with one or more embodiments of the disclosure.

FIG. 3 is a process flow diagram of an illustrative method 300 for online adaptive fusion framework for mobile device indoor localization in accordance with one or more embodiments of the disclosure. The key idea of particle filtering is to form a non-parametric estimate using a set of weighted random samples (e.g., particles). It is particularly useful when any of the distributions are non-linear or non-Gaussian. The three basic stages include motion prediction, sensor update, and resampling. For motion prediction, particles are spread out, translated and rotated according to the motion model, given the motion input from inertial sensors of the mobile device 104. The sensor update involves particles that are weighted by the measurements taken from additional sensors. Sensor update may use the wireless signal strengths (e.g., RSSI), the radio fingerprint database, and the floor plan map (if available) to calculate the weight of a particle. For example, a particle may be penalized if its location is within the wall or if the fingerprint does not match the fingerprint database. For resampling, while the particle filtering reiterates, the set of particles may degenerate and not be able to effectively represent a distribution due to the significant difference in weighting among particles. Resampling is a means to avoid the problem of degeneracy of the algorithm. It is achieved by subsampling from the set of particles to form another set to represent the exact same distribution.

The method 300 may incorporate the relative confidence between inertial sensor location tracking and the radio fingerprint location of the one or more access points 110 into the framework of particle filtering. The state hypothesis of each particle may include a location and a relative confidence level between the inertial sensor location tracking and radio fingerprinting.

At block 305, the data collection module 266 may receive data from a mobile device 104. In some embodiments, the data received may include wireless data measurements associated with the mobile device 104 and one or more access points 110 and inertial data associated with the mobile device 104. In some embodiments, the wireless data measurements may be received signal strength indictors. The inertial data may be data captured by one or more sensors (e.g., accelerometer, gyroscope, etc.) associated with the movement of the mobile device 104.

At block 310, the data collection module 266 may retrieve radio fingerprinting data associated with the one or more access points 110. The radio fingerprint data may be retrieved from one or more datastores 108. In some embodiments, the data collection module 266 may also retrieve one or more maps for an area where the mobile device 104 is generally located.

At block 315, the fusion engine 268 may receive information from the data collection module 266 and update a location estimate that is represented by a set of particles with the wireless data measurements received from the mobile device 104. In some embodiments, the location for each of the particles may be based at least in part on the radio fingerprinting data and inertial data associated with the mobile device 104.

At block 320, the fusion engine 268 may calculate a respective weight for the respective location for each of the plurality of particles. In some embodiments, the fusion engine 268 may calculate a respective penalty associated with the respective location for each of the plurality of particles.

In some embodiments, the fusion engine 268 may calculate a weight associated with the determined location for each of the particles based at least in part on radio fingerprint data and the respective weight for each of the determined locations for each of the particles.

At block 325, the fusion engine may identify a current location based at least in part on the respective location for each of the plurality of particles and the respective weight associated with the respective location for each of the particles.

At block 330, the fusion engine 268 may determine whether the particles are degenerated. If the particles are not degenerated, then the method 300 may reiterate and/or end. In some embodiments, the fusion engine 268 may determine the particles are degenerated based at least in part on the calculated weight associated with the particles. If the fusion engine 268 determines that the particles are degenerated, then at block 335, the fusion engine 268 may initiate a resampling of at least a portion of the wireless data measurements. Resampling may include requesting additional wireless data measurements and additional inertial data associated with the mobile device 104 from the mobile device 104 and iterating through the method 300.

Figure 4:
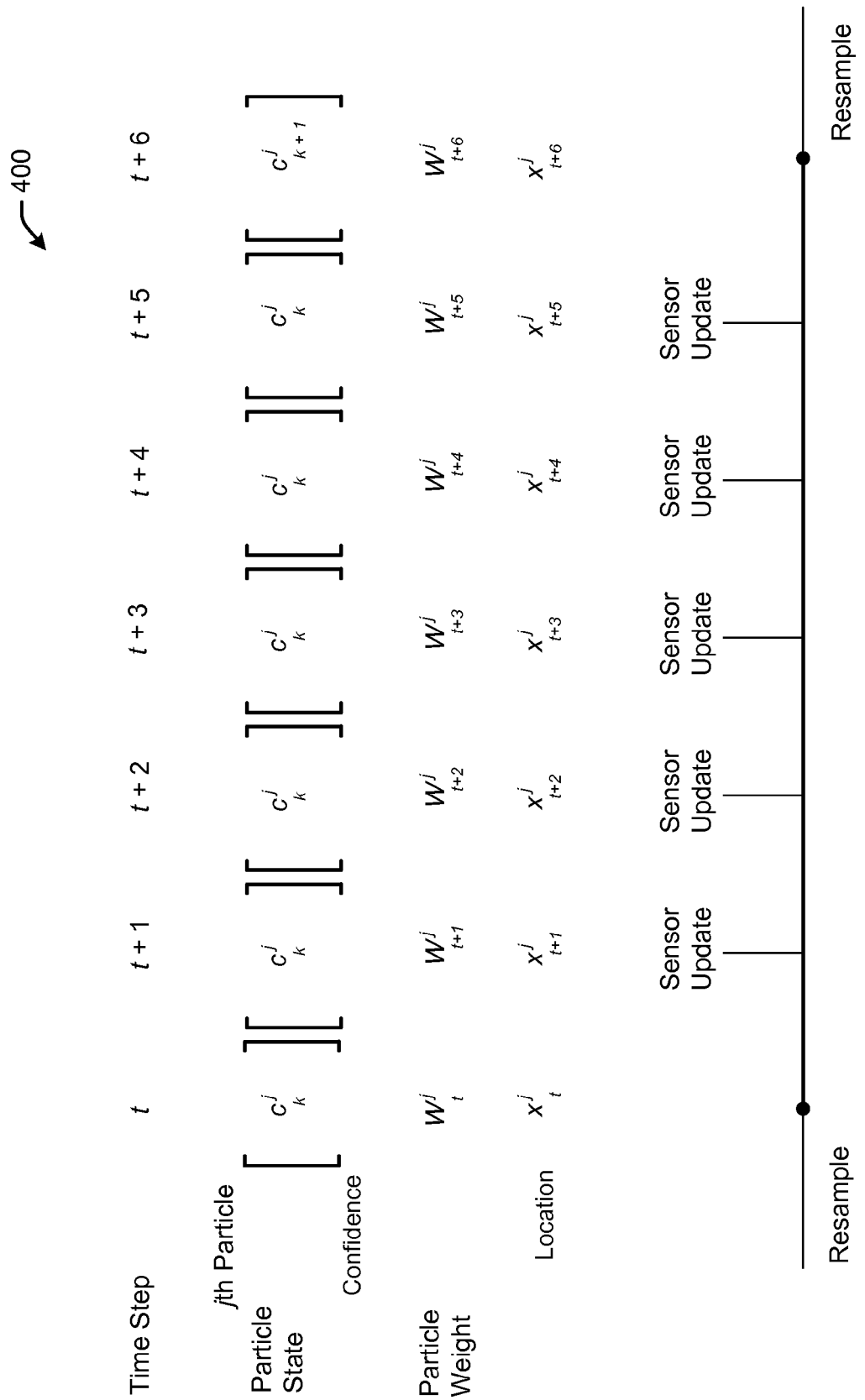
FIG. 4 is a graph of an illustrative process to update confidence levels for online adaptive fusion framework for mobile device indoor localization in accordance with one or more embodiments of the disclosure.

FIG. 4 is a graph 400 of an illustrative process to update confidence levels for online adaptive fusion framework for mobile device indoor localization in accordance with one or more embodiments of the disclosure. In some embodiments, the states of the jth particle may consist of a location x and a confidence c. The weight of the states for each jth particle may be updated at each time step and the confidence may be reinitialized upon resampling, at which the set of particles are resampling representing the distribution by majority. While the weight of a particle may evolve over time that aggregates the likelihoods of the various sensor measurements, the confidence level associated with a particle may remain constant in between resample to account for the local consistency of sensor data and the radio fingerprint database.

For example, in FIG. 4, from time step t to t+5, the confidence of the jth particle may remain as $c^j_k$. At resample time step t+6, the confidence level may be updated to be $c^j_{k+1}$.

In one embodiment, a non-transitory computer-readable medium may store computer-executable instructions which, when executed by a processor, cause the processor to perform operations including receiving data from a mobile device, wherein the data comprises a plurality of wireless data measurements associated with the mobile device and one or more access points and inertial data associated with the mobile device; retrieving radio fingerprinting data associated with the one or more access points; determining a respective location for each of a plurality of particles associated with the plurality of wireless data measurements based at least in part on the radio fingerprinting data and inertial data associated with the mobile device; calculating a respective weight for the respective location for each of the plurality of particles; maintaining a respective confidence level for the respective location for each of the plurality of particles; and identifying a current location based at least in part on the respective location for each of the plurality of particles and the respective weight associated with the respective location for each of the plurality of particles.

In one aspect of an embodiment, the operations may further include retrieving one or more maps for an area associated with the current location; calculating a respective penalty associated with the respective location for each of the plurality of particles; and re-calculating the respective weight for the respective location based at least in part on the calculated respective penalty associated with the respective location for each of the plurality of particles.

In one aspect of an embodiment, each of the plurality of wireless data measurements may include received signal strength indicators (RSSI) and the radio fingerprinting data comprises RSSI.

In one aspect of an embodiment, determining the respective location for each of the plurality of particles based at least in part on the radio fingerprinting data and inertial data associated with the mobile device may further include calculating a respective weight associated with the respective location for each of the plurality of particles based at least in part on radio fingerprint data and the respective confidence level for the respective location for each of the plurality of particles.

In one aspect of an embodiment, the operations may further include determining the plurality of particles are degenerated based at least in part on the respective weight; resampling at least a portion of the plurality of particles; and re-initializing the respective confidence level for the respective location for each of the plurality of particles based at least in part on the respective calculated weight associated with the respective location for each of the plurality of particles.

In one aspect of an embodiment, the resampling at least the portion of the plurality of particles may further include requesting additional wireless data measurements and additional inertial data associated with the mobile device.

In one aspect of an embodiment, the inertial data received from the mobile device may be captured by an accelerometer or a gyroscope.

In another embodiment, a computer-implemented method may be provided. The method may include receiving, by a server comprising one or more processors, data from a mobile device, wherein the data comprises a plurality of wireless data measurements associated with the mobile device and one or more access points and inertial data associated with the mobile device; retrieving, by the server, radio fingerprinting data associated with the one or more access points; determining, by the server, a respective location for each of a plurality of particles associated with the plurality of wireless data measurements based at least in part on the radio fingerprinting data and inertial data associated with the mobile device; calculating, by the server, a respective weight for the respective location for each of the plurality of particles; maintaining, by the server, a respective confidence level for the respective location for each of the plurality of particles; and identifying, by the server, a current location based at least in part on the respective location for each of the plurality of particles and the respective weight associated with the respective location for each of the plurality of particles.

In one aspect of an embodiment, the method may further include retrieving, by the server, one or more maps for an area associated with the current location; calculating, by the server, a respective penalty associated with the respective location for each of the plurality of particles; and re-calculating, by the server, the respective weight for the respective location based at least in part on the calculated respective penalty associated with the respective location for each of the plurality of particles.

In one aspect of an embodiment, each of the plurality of wireless data measurements may include received signal strength indicators (RSSI) and the radio fingerprinting data comprises RSSI.

In one aspect of an embodiment, determining the respective location for each of the plurality of particles based at least in part on the radio fingerprinting data and inertial data associated with the mobile device may include calculating, by the server, a respective weight associated with the respective location for each of the plurality of particles based at least in part on radio fingerprint data and the respective confidence level for the respective location for each of the plurality of particles.

In one aspect of an embodiment, the method may further include determining, by the server, the plurality of particles are degenerated based at least in part on the respective weight; resampling, by the server, at least a portion of the plurality of particles; and re-initializing, by the server, the respective confidence level for the respective location for each of the plurality of particles based at least in part on the respective calculated weight associated with the respective location for each of the plurality of particles.

In one aspect of an embodiment, resampling at least the portion of the plurality of particles may further include requesting, by the server, additional wireless data measurements and additional inertial data associated with the mobile device.

In one aspect of an embodiment, the inertial data received from the mobile device may be captured by an accelerometer or a gyroscope.

In another embodiment, a system may be provided. The system may include at least one antenna; at least on transceiver; at least one memory storing computer-executable instructions; and at least one processor, wherein the at least one processor is configured to access the at least one memory and to execute the computer-executable instructions to receive data from a mobile device, wherein the data comprises a plurality of wireless data measurements associated with the mobile device and one or more access points and inertial data associated with the mobile device; retrieve radio fingerprinting data associated with the one or more access points; determine a respective location for each of a plurality of particles associated with the plurality of wireless data measurements based at least in part on the radio fingerprinting data and inertial data associated with the mobile device; calculate a respective weight for the respective location for each of the plurality of particles; maintain a respective confidence level for the respective location for each of the plurality of particles; and identify a current location based at least in part on the respective location for each of the plurality of particles and the respective weight associated with the respective location for each of the plurality of particles.

In one aspect of an embodiment, the at least one processor is further configured to execute the computer-executable instructions to retrieve one or more maps for an area associated with the current location; calculate a respective weight associated with the respective location for each of the plurality of particles; and re-initialize the respective confidence level for the respective location based at least in part on particle disparity.

In one aspect of an embodiment, each of the plurality of wireless data measurements may include received signal strength indicators (RSSI) and the radio fingerprinting data comprises RSSI.

In one aspect of an embodiment, to determine the respective location for each of the plurality of particles based at least in part on the radio fingerprinting data and inertial data associated with the mobile device, the at least one processor is further configured to execute the computer-executable instructions to calculate a respective weight associated with the respective location for each of the plurality of particles based at least in part on radio fingerprint data and the respective confidence level for the respective location for each of the plurality of particles.

In one aspect of an embodiment, the at least one processor is further configured to execute the computer-executable instructions to determine the plurality of particles are degenerated based at least in part on the respective weight; resample at least a portion of the plurality of particles; and re-initialize the respective confidence level for the respective location for each of the plurality of particles based at least in part on the respective calculated weight associated with the respective location for each of the plurality of particles.

In one aspect of an embodiment, to resample at least the portion of the plurality of particles, the at least one processor is further configured to execute the computer-executable instructions to request additional wireless data measurements and additional inertial data associated with the mobile device.

In one aspect of an embodiment, the inertial data received from the mobile device may be captured by an accelerometer or a gyroscope.

In another embodiment, an apparatus may be provided. The apparatus may include at least one antenna; at least on transceiver; at least one memory storing computer-executable instructions; and at least one processor, wherein the at least one processor is configured to access the at least one memory and to execute the computer-executable instructions to receive data from a mobile device, wherein the data comprises a plurality of wireless data measurements associated with the mobile device and one or more access points and inertial data associated with the mobile device; retrieve radio fingerprinting data associated with the one or more access points; determine a respective location for each of a plurality of particles associated with the plurality of wireless data measurements based at least in part on the radio fingerprinting data and inertial data associated with the mobile device; calculate a respective weight for the respective location for each of the plurality of particles; maintain a respective confidence level for the respective location for each of the plurality of particles; and identify a current location based at least in part on the respective location for each of the plurality of particles and the respective weight associated with the respective location for each of the plurality of particles.

In one aspect of an embodiment, the at least one processor is further configured to execute the computer-executable instructions to retrieve one or more maps for an area associated with the current location; calculate a respective weight associated with the respective location for each of the plurality of particles; and re-initialize the respective confidence level for the respective location based at least in part on particle disparity.

In one aspect of an embodiment, each of the plurality of wireless data measurements may include received signal strength indicators (RSSI) and the radio fingerprinting data comprises RSSI.

In one aspect of an embodiment, to determine the respective location for each of the plurality of particles based at least in part on the radio fingerprinting data and inertial data associated with the mobile device, the at least one processor is further configured to execute the computer-executable instructions to calculate a respective weight associated with the respective location for each of the plurality of particles based at least in part on radio fingerprint data and the respective confidence level for the respective location for each of the plurality of particles.

In one aspect of an embodiment, the at least one processor is further configured to execute the computer-executable instructions to determine the plurality of particles are degenerated based at least in part on the respective weight; resample at least a portion of the plurality of particles; and re-initialize the respective confidence level for the respective location for each of the plurality of particles based at least in part on the respective calculated weight associated with the respective location for each of the plurality of particles.

In one aspect of an embodiment, to resample at least the portion of the plurality of particles, the at least one processor is further configured to execute the computer-executable instructions to request additional wireless data measurements and additional inertial data associated with the mobile device.

In one aspect of an embodiment, the inertial data received from the mobile device may be captured by an accelerometer or a gyroscope.

In another embodiment, a system may be provided. The system may include a means for receiving data from a mobile device, wherein the data comprises a plurality of wireless data measurements associated with the mobile device and one or more access points and inertial data associated with the mobile device; a means for retrieving radio fingerprinting data associated with the one or more access points; a means for determining a respective location for each of a plurality of particles associated with the plurality of wireless data measurements based at least in part on the radio fingerprinting data and inertial data associated with the mobile device; a means for calculating a respective weight for the respective location for each of the plurality of particles; a means for maintaining a respective confidence level for the respective location for each of the plurality of particles; and a means for identifying a current location based at least in part on the respective location for each of the plurality of particles and the respective weight associated with the respective location for each of the plurality of particles.

In one aspect of an embodiment, the system may include a means for retrieving one or more maps for an area associated with the current location; a means for calculating a respective penalty associated with the respective location for each of the plurality of particles; and a means for re-calculating the respective weight for the respective location based at least in part on the calculated respective penalty associated with the respective location for each of the plurality of particles.

In one aspect of an embodiment, each of the plurality of wireless data measurements may include received signal strength indicators (RSSI) and the radio fingerprinting data comprises RSSI.

In one aspect of an embodiment, the means for determining the respective location for each of the plurality of particles based at least in part on the radio fingerprinting data and inertial data associated with the mobile device further may include a means for calculating a respective weight associated with the respective location for each of the plurality of particles based at least in part on radio fingerprint data and the respective confidence level for the respective location for each of the plurality of particles.

In one aspect of an embodiment, the system may include a means for determining the plurality of particles are degenerated based at least in part on the respective weight; a means for resampling at least a portion of the plurality of particles; and a means for re-initializing the respective confidence level for the respective location for each of the plurality of particles based at least in part on the respective calculated weight associated with the respective location for each of the plurality of particles.

In one aspect of an embodiment, the means for resampling at least the portion of the plurality of particles may include a means for requesting additional wireless data measurements and additional inertial data associated with the mobile device.

In one aspect of an embodiment, the inertial data received from the mobile device may be captured by an accelerometer or a gyroscope.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:

identifying data, received by a transceiver from a mobile device and one or more access points, the data comprising a plurality of wireless data measurements associated with a mobile device and one or more access points and inertial data associated with the mobile device;

retrieving, from the transceiver, radio fingerprinting data associated with the one or more access points;

determining a respective location for each of a plurality of particles associated with the plurality of wireless data measurements based at least in part on the radio fingerprinting data and inertial data associated with the mobile device;

calculating a respective weight for the respective location for each of the plurality of particles;

maintaining a respective confidence level for the respective location for each of the plurality of particles; and identifying a current location based at least in part on the respective location for each of the plurality of particles and the respective weight associated with the respective location for each of the plurality of particles.

2. The non-transitory computer-readable medium of claim 1, wherein the operations further comprise:

retrieving one or more maps for an area associated with the current location, via the at least one transceiver;

calculating a respective penalty associated with the respective location for each of the plurality of particles; and re-calculating the respective weight for the respective location based at least in part on the calculated respective penalty associated with the respective location for each of the plurality of particles.

3. The non-transitory computer-readable medium of claim 1, wherein each of the plurality of wireless data measurements comprises received signal strength indicators (RSSI) and the radio fingerprinting data comprises RSSI.

4. The non-transitory computer-readable medium of claim 3, wherein determining the respective location for each of the plurality of particles based at least in part on the radio fingerprinting data and inertial data associated with the mobile device further comprises:

calculating a respective weight associated with the respective location for each of the plurality of particles based at least in part on radio fingerprint data and the respective confidence level for the respective location for each of the plurality of particles.

5. The non-transitory computer-readable medium of claim 4, wherein the operations further comprise:

determining the plurality of particles are degenerated based at least in part on the respective weight;

resampling at least a portion of the plurality of particles; and re-initializing the respective confidence level for the respective location for each of the plurality of particles based at least in part on the respective calculated weight associated with the respective location for each of the plurality of particles.

6. The non-transitory computer-readable medium of claim 5, wherein the resampling at least the portion of the plurality of particles further comprises:

requesting additional wireless data measurements and additional inertial data associated with the mobile device, via the at least one transceiver.

7. The non-transitory computer-readable medium of claim 1, wherein the inertial data received from the mobile device is captured by an accelerometer or a gyroscope.

8. A computer-implemented method comprising:

identifying, by a server comprising one or more processors, data received by a transceiver from a mobile device and one or more access points, the data comprising a plurality of wireless data measurements associated with the mobile device and one or more access points and inertial data associated with the mobile device;

retrieving, from the transceiver by the server, radio fingerprinting data associated with the one or more access points;

determining, by the server, a respective location for each of a plurality of particles associated with the plurality of wireless data measurements based at least in part on the radio fingerprinting data and inertial data associated with the mobile device;

calculating, by the server, a respective weight for the respective location for each of the plurality of particles;

maintaining, by the server, a respective confidence level for the respective location for each of the plurality of particles; and identifying, by the server, a current location based at least in part on the respective location for each of the plurality of particles and the respective weight associated with the respective location for each of the plurality of particles.

9. The computer-implemented method of claim 8, further comprising:

retrieving, by the server, one or more maps for an area associated with the current location;

calculating, by the server, a respective penalty associated with the respective location for each of the plurality of particles; and re-calculating, by the server, the respective weight for the respective location based at least in part on the calculated respective penalty associated with the respective location for each of the plurality of particles.

10. The computer-implemented method of claim 8, wherein each of the plurality of wireless data measurements comprises received signal strength indicators (RSSI) and the radio fingerprinting data comprises RSSI.

11. The computer-implemented method of claim 10, wherein determining the respective location for each of the plurality of particles based at least in part on the radio fingerprinting data and inertial data associated with the mobile device further comprises:

calculating, by the server, a respective weight associated with the respective location for each of the plurality of particles based at least in part on radio fingerprint data and the respective confidence level for the respective location for each of the plurality of particles.

12. The computer-implemented method of claim 11, further comprising:

determining, by the server, the plurality of particles are degenerated based at least in part on the respective weight;

resampling, by the server, at least a portion of the plurality of particles; and re-initializing, by the server, the respective confidence level for the respective location for each of the plurality of particles based at least in part on the respective calculated weight associated with the respective location for each of the plurality of particles.

13. The computer-implemented method of claim 12, wherein resampling at least the portion of the plurality of particles further comprises:

requesting, by the server, additional wireless data measurements and additional inertial data associated with the mobile device.

14. The computer-implemented method of claim 8, wherein the inertial data received from the mobile device is captured by an accelerometer or a gyroscope.

15. A system comprising:
at least one antenna;
at least one transceiver;
at least one memory storing computer-executable instructions; and
at least one processor, wherein the at least one processor is configured to access the at least one memory and to execute the computer-executable instructions to:
  identify data received by the at least one transceiver from a mobile device and one or more access points, wherein the data comprises a plurality of wireless data measurements associated with the mobile device and one or more access points and inertial data associated with the mobile device;
  retrieve, from the at least one transceiver, radio fingerprinting data associated with the one or more access points;
  determine a respective location for each of a plurality of particles associated with the plurality of wireless data measurements based at least in part on the radio fingerprinting data and inertial data associated with the mobile device;
  calculate a respective weight for the respective location for each of the plurality of particles;
  maintain a respective confidence level for the respective location for each of the plurality of particles; and
  identify a current location based at least in part on the respective location for each of the plurality of particles and the respective weight associated with the respective location for each of the plurality of particles.

16. The system of claim 15, wherein the at least one processor is further configured to execute the computer-executable instructions to:
  identify one or more maps for an area associated with the current location, received by a transceiver from a server;
  calculate a respective weight associated with the respective location for each of the plurality of particles; and
  re-initialize the respective confidence level for the respective location based at least in part on particle disparity.

17. The system of claim 15, wherein each of the plurality of wireless data measurements comprises received signal strength indicators (RSSI) and the radio fingerprinting data comprises RSSI.

18. The system of claim 17, wherein to determine the respective location for each of the plurality of particles based at least in part on the radio fingerprinting data and inertial data associated with the mobile device, the at least one processor is further configured to execute the computer-executable instructions to:
  calculate a respective weight associated with the respective location for each of the plurality of particles based at least in part on radio fingerprint data and the respective confidence level for the respective location for each of the plurality of particles.

19. The system of claim 18, wherein the at least one processor is further configured to execute the computer-executable instructions to:
  determine the plurality of particles are degenerated based at least in part on the respective weight;
  resample at least a portion of the plurality of particles; and
  re-initialize the respective confidence level for the respective location for each of the plurality of particles based at least in part on the respective calculated weight associated with the respective location for each of the plurality of particles.

20. The system of claim 19, wherein to resample at least the portion of the plurality of particles, the at least one processor is further configured to execute the computer-executable instructions to:
  identify additional wireless data measurements and additional inertial data associated with the mobile device, received by a transceiver from a server.

21. The system of claim 15, wherein the inertial data received from the mobile device is captured by an accelerometer or a gyroscope.

* * * * *